United States Patent [19]

Armstrong et al.

[11] Patent Number: 4,648,999

[45] Date of Patent: Mar. 10, 1987

[54] APPARATUS FOR CONTACTING FLUID WITH SOLID

[75] Inventors: Robert B. Armstrong, Katy; Huibert S. Jongenburger, Houston; Pasupati Sadhukhan, Katy, all of Tex.

[73] Assignee: M. W. Kellogg Company, Tex.

[21] Appl. No.: 758,210

[22] Filed: Jul. 22, 1985

[51] Int. Cl.[4] .............................................. B01F 3/04
[52] U.S. Cl. .................... 261/77; 210/221.2; 261/123; 422/231
[58] Field of Search ............... 261/77, 123; 422/140, 422/215, 231; 208/213; 210/221.2; 209/170

[56]  References Cited

U.S. PATENT DOCUMENTS

| 2,885,272 | 5/1959 | Kimberlin, Jr. et al. | 422/231 X |
| 3,043,433 | 7/1962 | Singer | 261/123 X |
| 3,583,905 | 6/1971 | Oguchi et al. | 208/213 |
| 3,785,966 | 1/1974 | Oguchi et al. | 208/213 |
| 3,817,856 | 6/1974 | Aaron et al. | 208/213 |
| 3,826,739 | 7/1974 | Kubo et al. | 208/213 X |
| 4,134,734 | 1/1979 | Winter, III | 261/77 X |

FOREIGN PATENT DOCUMENTS

| 1248345 | 10/1960 | France | 422/231 |
| 6219 | 2/1972 | Japan | 208/213 |
| 125861 | 9/1979 | Japan | 261/123 |
| 60-23483 | 2/1985 | Japan | |
| 680753 | 9/1979 | U.S.S.R. | 261/77 |

Primary Examiner—Richard L. Chiesa
Attorney, Agent, or Firm—McGlew and Tuttle

[57] ABSTRACT

An apparatus for contacting fluids combined with solids comprises a cylindrical vessel with a slurry or liquid feed inlet port, a liquid outlet port, a gas inlet port and a gas outlet port. The vessel includes a lower cylindrical baffle which defines a stilling chamber therearound, the main contacting section of the vessel being above the stilling chamber. The lower end of the baffle extends below the liquid outlet port which discharges liquid from the stilling chamber. A cylindrical member is disposed in the cylindrical vessel inwardly of the stilling chamber. It has a lower end which is aligned with the gas inlet port for receiving gas therefrom and an upper end which is higher than a lower edge of the cylindrical baffle. The main contacting section above the cylindrical member has a height which makes a ratio with a length of the cylindrical member having a value within the range between 2 and 50.

14 Claims, 11 Drawing Figures

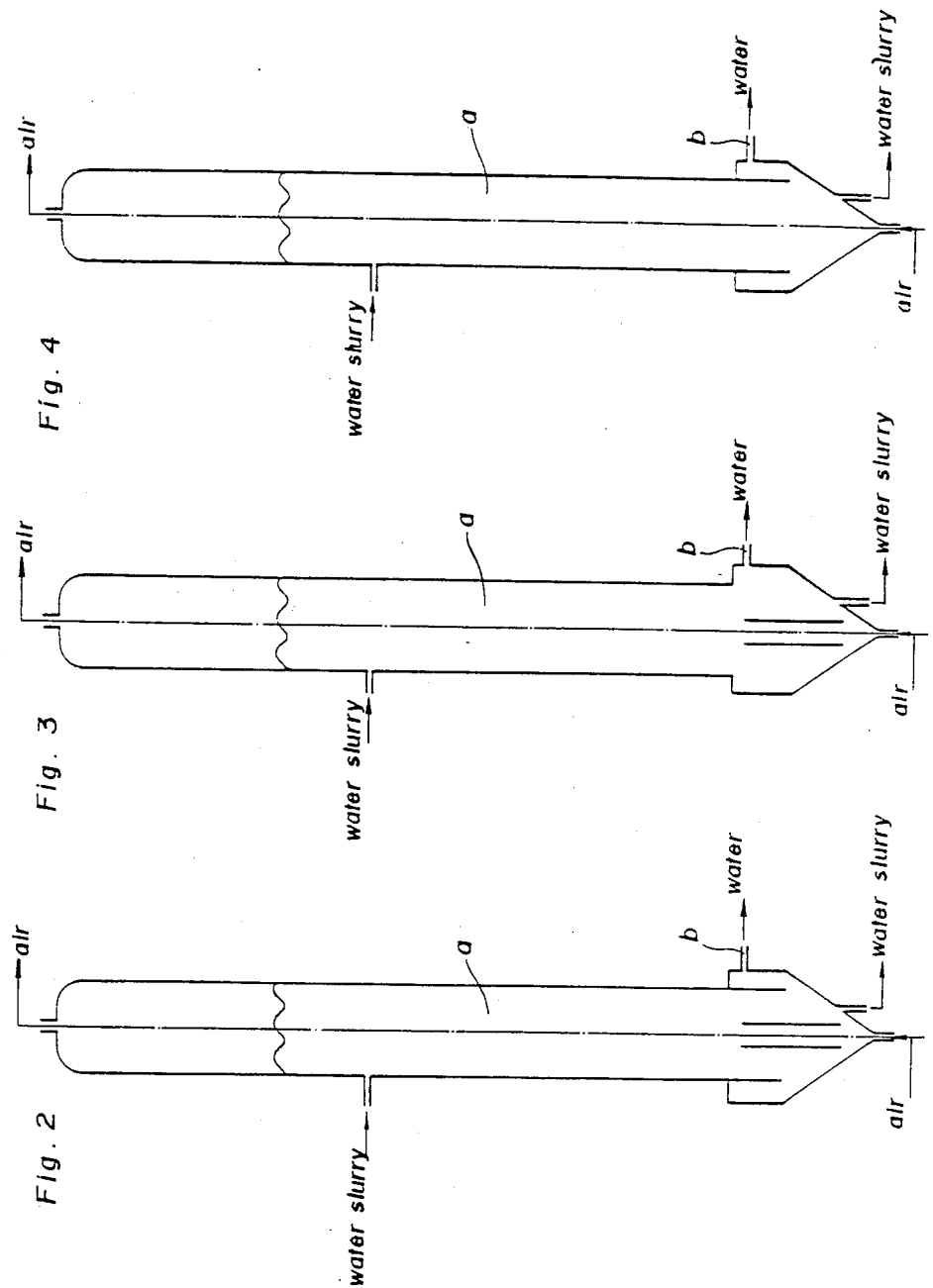

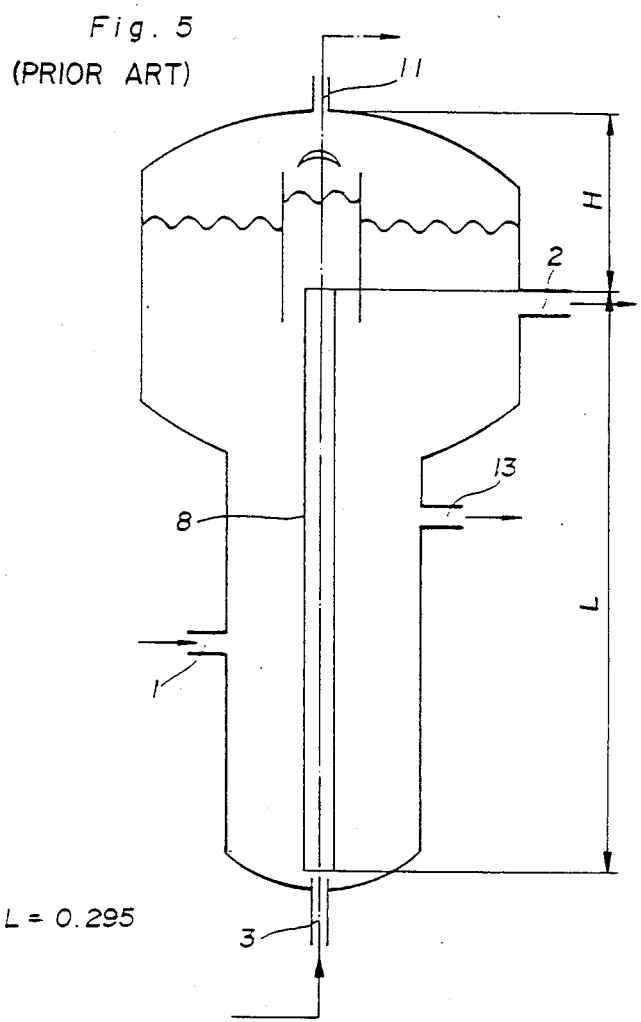

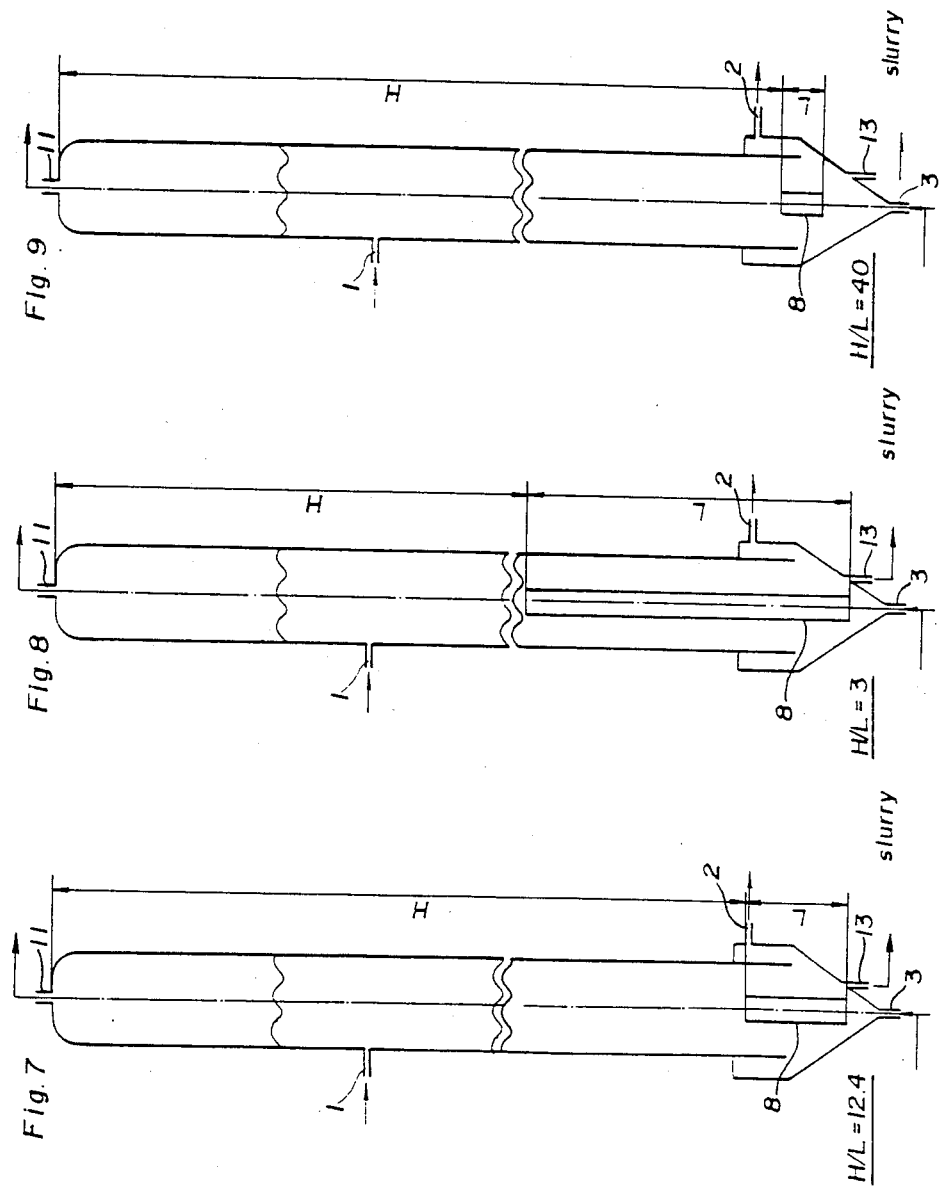

APPARATUS FOR CONTACTING FLUID WITH SOLID

BACKGROUND OF THE INVENTION

This invention relates to an apparatus for contacting fluids with solids. More particularly, this invention relates to an apparatus for contacting fluids with solids wherein liquid, solids such as fine particles and gas are contacted efficiently, solid-liquid separation is effected easily, and liquid free from solids is efficiently discharged to the outside of the system.

Various apparatuses and methods have heretofore been proposed for contacting fluid such as liquid and gas with solids. Particularly, many industrial techniques have been established for the cases where the solids are catalyst particles.

Of these methods, the method using a suspension bed is especially suitable for contacting viscous liquid with solid particles. The method using a suspension bed means the method of contacting a liquid with solid particles which, suspended in the liquid, are present in a vertical reactor. But, this method has several disadvantages, namely, that (i) the reactor becomes clogged since the fluidization of the slurry mixture stops suddenly, that (ii) solid particles are entrained by products, and that (iii) it is very difficult to make a high-concentration slurry flow through a provided pipe line smoothly. To solve these problems, a method wherein a reactor provided with a stilling region therein is used has been proposed, for example, in Japanese Patent Koukai No. 60-23483 (1985) and U.S. Pat. No. 3,817,856 and U.S. Pat. No. 3,785,966. However, this method is not completely satisfactory.

SUMMARY OF THE INVENTION

The object of the present invention is to provide an apparatus for contacting fluids with solids which eliminates the problems of the conventional techniques by improving the configuration of the apparatus.

BRIEF DESCRIPTION OF THE DRAWING

FIGS. 1 to 2 and 7 to 10 are explanatory sectional views showing embodiments of the apparatus in accordance with the present invention, and FIGS. 3, 4 are explanatory sectional views showing embodiments of apparatus in accordance with the comparative examples.

FIG. 5 is an explanatory sectional view showing the apparatus disclosed in Japanese Patent Koukai No. 60-23483.

DETAILED DESCRIPTION OF THE INVENTION

The present invention will hereinbelow be described with reference to the accompanying drawings.

Figure 1:
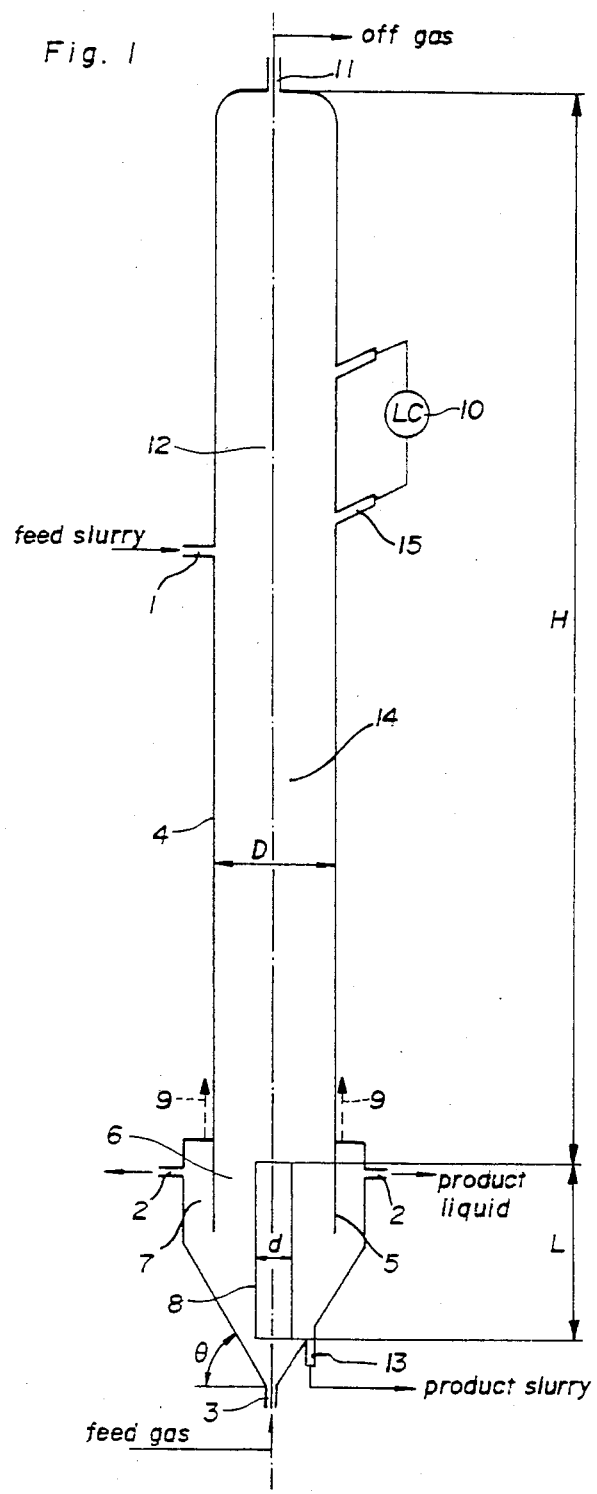

FIG. 1 is an explanatory sectional view showing an embodiment of the apparatus in accordance with the present invention.

The present invention provides an apparatus for contacting fluids with solids which includes a cylindrical vessel 4 provided with a slurry or liquid feed inlet port or means 1, a product liquid outlet port or means 2, and a gas inlet port or means 3 at the bottom. A stilling chamber 7 is formed in the cylindrical vessel 4 by positioning a baffle 5 with a cylindrical skirt portion so that the lower end is lower than the product liquid outlet means 2. A cylindrical member 8 is positioned between the top and the bottom of the cylindrical vessel 4 in spaced relation thereto along the ascending passage of gas from the gas inlet means 3 so that the upper end of the cylindrical member 8 is higher than the lower end of the baffle 5 with a cylindrical skirt portion. The improvement of the invention comprises positioning a main contacting section 14 above the cylindrical member 8, and adjusting the ratio (H/L) of the height (H) between the upper end of the cylindrical member 8 and the top of the internal space of the cylindrical vessel 4 to the length (L) of the cylindrical member 8 to a valve within the range between 2 and 50, and preferably adjusting the ratio (L/D) of the length (L) of the cylindrical member 8 to the inner diameter (D) of the main contacting section 14 positioned above the cylindrical member 8 to a value between 0.5 and 10.

In the apparatus of the present invention, fluid and solid are contacted with each other as described below. First, gas is introduced from the gas inlet means 3 at the bottom of a cylindrical vessel 4. The gas inlet means 3 should preferably be installed so that gas is introduced upwardly into the cylindrical vessel 4, and may be a single means or a plurality of means. The kind of gas is not limited and may be selected as desired in accordance with the application. For example, when the gas is introduced as a power source for fluidizing and stirring slurry containing solid particles, the gas may be an inert gas such as nitrogen gas or argon gas. When the gas is fed as a raw material for reaction, hydrogen gas, oxygen gas or a synthetic gas may be selected in accordance with the reaction.

On the other hand, slurry is introduced from a slurry or liquid feed inlet means 1. The position of the feed inlet means 1 is not limited, and the feed inlet means 1 may be installed at an arbitrary position outside of the stilling chamber 7. The introduced slurry comprises liquid and solid particles suspended in the liquid. The solid particles have a specific gravity larger than that of the liquid and naturally settles gradually when left to stand. The types of the liquid and solid particles constituting the slurry may be selected as desired in accordance with the application. For example, various liquid raw materials for reaction such as water, alcohol and hydrocarbons may be used as the liquid, and an absorbent, a catalyst and a catalyst carrier may be used as the solid particles.

At the step where the slurry feeding from the slurry or liquid feed inlet means 1 into the apparatus is started, the products liquid outlet means 2 should preferably be closed. It should be opened when the fed slurry reaches a predetermined level. The slurry level should be such that a sufficient space is left in the upper section of the cylindrical vessel 4. If the slurry level is too high, the liquid or the solid particles are entrained by the gas when the gas is separated. The slurry level may be adjusted by use of a level controller 10 by detecting the differential pressure via side pipes 15. It is also possible to control the slurry level by detecting it by use of radiation.

The slurry introduced from the slurry or liquid feed inlet means 1 enters cylindrical member 8 from the bottom of the cylindrical vessel 4, and is moved upwardly by the ascending gas stream. It is also possible to install a plurality of the cylindrical member 8. The cylindrical member 8 should be spaced from the bottom of the cylindrical vessel 4 so that main contacting section 14 is formed above the cylindrical member 8.

The ratio (H/L) of the height (H) between the upper end of the cylindrical member 8 and the top of the internal space of the cylindrical vessel 4 to the length (L) of the cylindrical member 8 should be between 2 and 50, preferably be between 5 and 20.

The lower end of the cylindrical member 8 should be spaced from the bottom of the cylindrical vessel 4 so that the slurry of solid particles descending to the lower section of the cylindrical vessel 4 is caused to flow into the cylindrical member 8 by the gas stream ascending from the bottom of the cylindrical vessel 4.

The ratio (Si/So) of the internal cross-sectional area (Si) at the lower end section of the cylindrical member 8 to the minimum cross-sectional area (So) of the space around the cylindrical member 8 calculated by subtracting the cross-sectional area of the cylindrical member 8 from the internal cross-section of the cylindrical vessel 4 at the lower end of the cylindrical member 8 should preferably be between 0.5 and 4, more preferably be between 0.5 and 1. When the (Si/So) ratio is less than 0.5, the gas introduced from the gas inlet means 3 goes outside of the cylindrical member 8 and cannot smoothly ascend inside of the cylindrical member 8. When the So value is too small and the aforesaid ratio (Si/So) is larger than 4, the slurry return speed becomes undesirably low.

Figure 10:
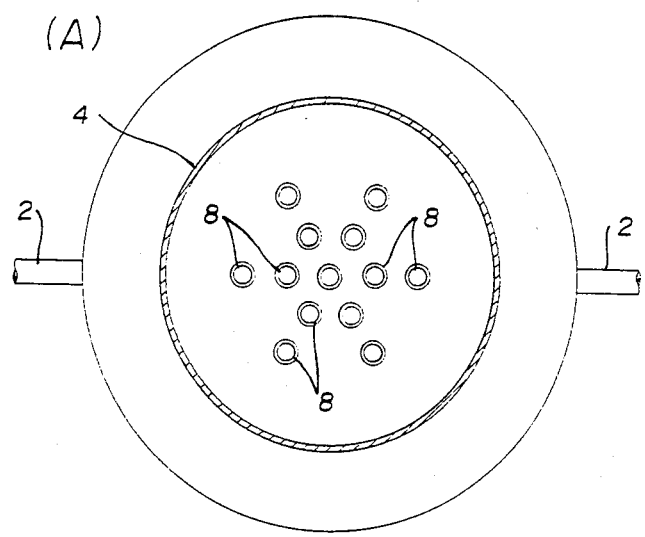
Figure 10:
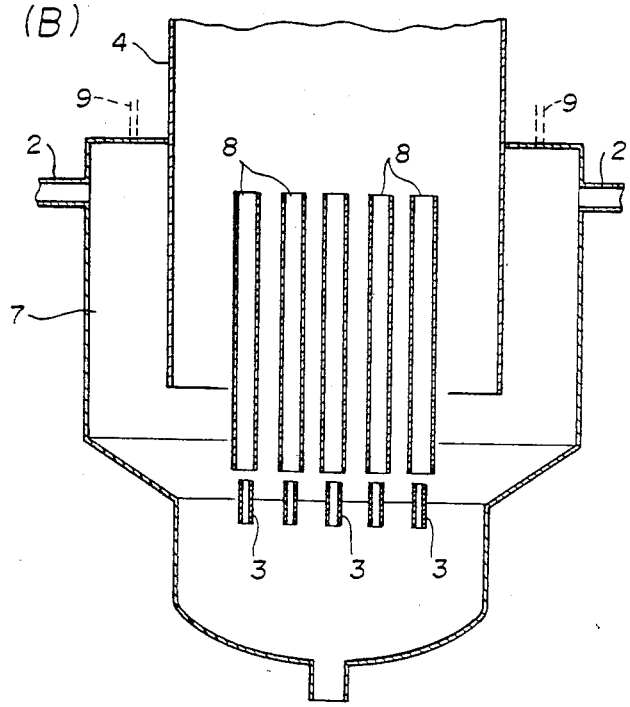

Further, the cylindrical member 8 should be positioned approximately vertically just above the gas inlet means 3 so that the gas stream from the gas inlet means 3 can ascend efficiently. When the cylindrical member 8 is positioned in this manner, solid particles contained in the slurry move upwardly together with the gas stream inside of the cylindrical member 8, and overflows from the upper end of the cylindrical member 8 to the main contacting section 14 or a descending region 6. In this case, the ascending speed and the overflowing speed of the slurry containing the solid particles are changed by the gas flow rate, and can be adjusted easily and in the range typically of 0.3 to 2.0 m/sec to promote good suspension of solids in liquid. When a plurality of the cylindrical members 8 are installed, it is necessary to install a plurality of the gas inlet means 3 in accordance with the number of the cylindrical members 8 as shown in FIG. 10.

Most of the slurry overflowing from the upper end of the cylindrical member 8 ascends through the main contacting section 14, and the gas is separated therefrom in a gas separating region 12. A part of the slurry in the main contacting section 14 enters the descending region 6 and begins descending.

As described above, the slurry overflowing and ascending through the main contacting section 14 is separated from the gas contained in bubble form in the gas separating region 12. The separated gas is discharged to the exterior from a gas outlet means 11.

In the present invention, baffle 5 with a cylindrical skirt portion is positioned inside of the cylindrical vessel 4 to form stilling chamber 7. The baffle 5 with a cylindrical skirt portion is installed so that the lower end thereof is lower than a products liquid outlet means 2 in the side face of the cylindrical vessel 4 and lower than the upper end of the cylindrical member 8. The distance from the lower end of the baffle 5 with a cylindrical skirt portion to the products liquid outlet means 2 is not limited and may be such that no swaying motion of the liquid flow arises. However, the distance should preferably be such that the residence time of the liquid in the stilling chamber 7 is between one minute and 120 minutes.

Further, the baffle 5 with a cylindrical skirt portion is installed so that the slurry descending region 6 is formed between the baffle 5 and the outer wall of the cylindrical member 8. The ratio (Sr/Si) of the cross-sectional area (Sr) of the main contacting section 14 to the cross-sectional area (Si) of the slurry ascending region inside of the cylindrical member 8, i.e. the internal cross-sectional area of the cylindrical member 8 (or the total of the internal cross-sectional areas of the cylindrical members 8 when a plurality of the cylindrical members 8 are provided), is not limited and may be adjusted appropriately in accordance with conditions. However, the ratio (Sr/Si) should preferably be between 4 and 100, more preferably be between 4 and 25.

The baffle 5 with a cylindrical skirt portion positioned inside of the cylindrical vessel 4 may be of any type insofar as it defines the stilling chamber 7 when positioned as described above. Also, the baffle 5 with a cylindrical skirt portion may be provided with purge gas outlet 9 through which the gas is passed upwardly. If necessary, the purge gas outlets 9 may be extended up to a point above the filled slurry level so that no slurry falls into the purge gas outlets 9. When the purge gas outlet 9 is lower than the filled slurry level, it is possible to introduce a small amount of gas from the upper section of the stilling chamber 7 to prevent the slurry from entering the purge gas outlets 9.

By the baffle 5 with a cylindrical skirt portion, the stilling chamber 7 and the descending region 6 are individually formed in the apparatus. When the baffle 5 with a cylindrical skirt portion is not installed and the slurry overflowing from the upper end of the cylindrical member 8 reaches the products liquid outlet means 2 in the stirred condition, separation between the liquid and the solid particles in the slurry becomes insufficient, and the solid particles are discharged from the system together with the liquid from the products liquid outlet means 2, causing various problems such as pipe clogging. The cross-section area of the stilling chamber 7 should be designed that the ascending linear speed of the liquid does not exceed the free settling velocity of the solid particles in liquid when the products liquid is discharged. In the stilling chamber 7, the liquid flow rate should be as low as possible, preferably between 0.0005 m/second and 0.005 m/second.

It is necessary that the lower end of the aforesaid baffle 5 with a cylindrical skirt portion is lower than the products liquid outlet means 2. In this configuration, a part of slurry overflowing form the upper end of the cylindrical member 8 descends through the descending region 6 and settles via the lower end of the baffle 5 with a cylindrical skirt portion. On the other hand, a part of the liquid contained in the slurry passes from the stilling chamber 7 to the products liquid outlet means 2 and is discharged from the system.

At this time, the solid particles passing through the descending region 6 and the lower end of the baffle 5 with a cylindrical skirt portion 5 and further moving downwardly do not turn around the lower end of the baffle 5 into the stilling chamber 7. Therefore, the liquid discharged to the exterior does not contain the solid particles. The liquid is discharged after sufficiently contacting the solid particles and the gas, and is a reaction product when the components are reactive with each other.

The slurry descending through the descending region 6 continues to descend and moves to the lower section of the cylindrical vessel 4. Near the overflowing point at the upper end of the cylindrical member 8, the descending slurry is in the velocity fluidized and stirred condition. Thereafter, the slurry descends in the comparatively gentle turbulent condition.

When a predetermined amount of the slurry is introduced into the apparatus, thereafter only the liquid is introduced, and the solid particles are circulated in the apparatus, discharging of the solid particles in the slurry is not necessary. When the slurry is continuously introduced, discharging of the slurry, particularly the solid particles, is necessary. In this case, the slurry may be discharged from the lower section of the apparatus where the concentration of the solid particles is high. Therefore, the slurry outlet means 13 may be installed at a comparatively low section of the cylindrical vessel 4, and a part of the slurry containing the solid particles at a high concentration.

The slurry further moves to the bottom. The solid particles reaching the bottom are caused by the ascending gas stream to enter the cylindrical member 8 from the space between the lower end of the cylindrical member 8 and the bottom of the cylindrical vessel 4, and overflow from the upper end of the cylindrical member 8.

A part of the gas-liquid-solid mixture overflowing from the cylindrical member 8 enters and descends through the descending region 6, and most of the mixture ascends through the main contacting section 14 formed above the cylindrical member 8. In the apparatus of the present invention, the ratio (H/L) should be between 2 and 50, preferably between 5 and 20. When the ratio (H/L) is lower than this range, the gas is not utilized efficiently and it becomes necessary to recycle the gas many times. When the ratio (H/L) is larger than 2, the area of contact among the gas, the liquid and the solid becomes large, and it becomes possible to efficiently utilize the gas. For example, the reaction can be effected in the presence of a sufficient amount of the gas.

In the apparatus of the present invention, a circulating flow of the slurry containing the solid particles arises in the lower section of the cylindrical vessel 4, so that solid particles can be fluidized by a smaller amount of the gas, and the solid particles, the liquid and the gas are contacted with each other sufficiently. Further, separation of the gas and the liquid can be performed easily and nearly completely. Particularly, in liquid separation, entering of the solid particles is prevented easily and securely.

The apparatus of the present invention having the aforesaid basic configuration may be modified in accordance with the application, the size, shape, type and concentration of the solid particles in the slurry, and other conditions. For example, the inclination angle of the bottom of the cylindrical vessel 4 may be selected from the range of 10° to 80° and the bottom may be shaped as an elliptic head.

It is preferred to shorten the distance between the gas inlet means 3 and the cylindrical member 8 by upwards or vertically extending the gas inlet means 3 which is attached to the cone top at the bottom of the cylindrical vessel 4, in order to prevent the gas which is introduced through the gas inlet means 3 from coming into the descending region 6 and the stilling chamber 7, and in order to introduce the gas into the cylindrical member 8 in a stable state. This vertically upward extension of the gas inlet means 3 causes the introduced gas to enter the cylindrical member 8 in a stable state with the ratio of (Si/So) kept unchanged.

It is possible to install a horizontal fillet at the position of the nozzle outlet of the gas inlet means 3 in order to prevent solid particles from depositing under the gas inlet means 3 extended vertically upwards. If the bottom cone of the cylindrical vessel 4 is properly flattened, the deposition of solid particles is prevented, and the gas bubbles through the gas inlet means 3 may be introduced into the cylindrical member 8 in a stable state.

In the apparatus of the present invention, since the liquid in the slurry can be separated easily, it becomes possible to use fine solid particles which were difficult to separate by the conventional technique. As a result, fluidity of the solid particles is improved, and the solid particles can be fluidized only with the gas without using the liquid for fluidizing. Thus the running cost becomes low. Also, since contact among the solid particles, the liquid and the gas is performed sufficiently and consistently, the efficiency of reaction, adsorption or absorption among the components is improved, and the desired object is accomplished securely. Further, the apparatus of the present invention has the following advantages:

(1) The solid particles do not enter the discharged liquid. Therefore, the post-processing is easy and line clogging does not arise.

(2) Because of the advantage in 1 and since slurry discharging and supply can be performed without interrupting the operation, continuous operation can be performed consistently for long periods.

(3) The contacting conditions can be selected easily from a wide variety of values. For example, slurry having various concentrations from a low value to a high value can be treated within desired residence time in the apparatus.

(4) The apparatus is applicable to a wide variety of applications such as physical treatment, e.g. absorption, drying, adsorption, desorption and washing, and chemical treatment, e.g. oxidation, reduction, decomposition and hydration. In any application, good results are obtained.

(5) The area of contact among the gas, the liquid and the solid is large, and the solid can be fluidized by a small amount of gas through circulation around the cylindrical member 8. Thus the gas can be utilized efficiently.

The apparatus of the present invention having the aforesaid advantages can be efficiently utilized for petroleum refining, various chemical industries and coal applications.

The present invention will further be described with reference to the following non-limitative examples.

EXAMPLE 1 AND COMPARATIVE EXAMPLES 1,2

An experiment for contacting water, air and solid particles with each other was conducted by using the apparatus shown in FIG. 2. Air was introduced at a gas superficial velocity (i.e. the gas ascending linear velocity at cross-sectional area (Sr) of the main contacting section 14) of 5 cm/second. The liquid was fed and discharged at a rate of 10 liters/hour, and the solid particle concentration in the discharged liquid was measured. The measurement results are shown in Table 1.

Then, Comparative Examples 1 and 2 were conducted in the same way by using the apparatus shown in FIG. 3 obtained by removing the baffle 5 with a cylindrical skirt portion from the apparatus used in Example 1, and the apparatus shown in FIG. 4 obtained by removing the cylindrical member 8 from the apparatus used in Example 1. The results are shown in Table 1. The concentration of the solid particles entrained in the liquid discharged when the solid particle concentration in the apparatus (solid particle concentration/entire slurry amount) was 30 wt%, was 0.1 wt% in Example 1, a value which was much smaller than in Comparative Examples 1 and 2. By using the apparatus of the present invention, it was possible to easily achieve solid-liquid separation in the apparatus.

Then, the gas superficial velocity necessary for preventing settlement in the apparatus at the solid particle concentration of 30 wt% was measured by use of the apparatuses shown in FIGS. 2 to 4. In Example 1 conducted by use of the apparatus of FIG. 2, the value was about 40% lower than in Comparative Example 2, and it was possible to achieve sufficient fluid-solid contact with a small amount of gas.

The dimensions of the apparatuses used in Example 1 and Comparative Examples 1 and 2 were as shown below.

Entire length: 2.5 m
H/L: 12.4
Sr/Si: 9.0

EXAMPLE 2 AND COMPARATIVE EXAMPLE 3

In general, in three-phase contact among gas, liquid and solid, the mass transfer resistance is present at the gas-liquid boundary. Therefore, in order to confirm the effects of the present invention exhibiting a high gas-liquid-solid contact efficiency, an experiment for contacting water, air and solid particles was conducted in Example 2 by using the apparatus shown in FIG. 2. Comparative Example 3 was conducted in the same manner by use of the apparatus shown in FIG. 5 as disclosed in Japanese Patent Koukai No. 60-23483.

In the experiment, deaerated water and air were continuously introduced into the cylindrical vessel 4, and gas-liquid-solid three-phase contacting was conducted in the presence of previously filled solid particles. The concentration of oxygen dissolved in water and the volumetric liquid-phase mass transfer coefficient (KLa) was measured. The results are shown in FIG. 6.

A high volumetric liquid-phase mass transfer coefficient (KLa) indicates that, in the case of the hydrogenating reactor, hydrogen gas is quickly dissolved in oil, the reaction does not readily become the mass transfer rate-determining condition, and it is possible to effect consistent reaction.

Figure 6:
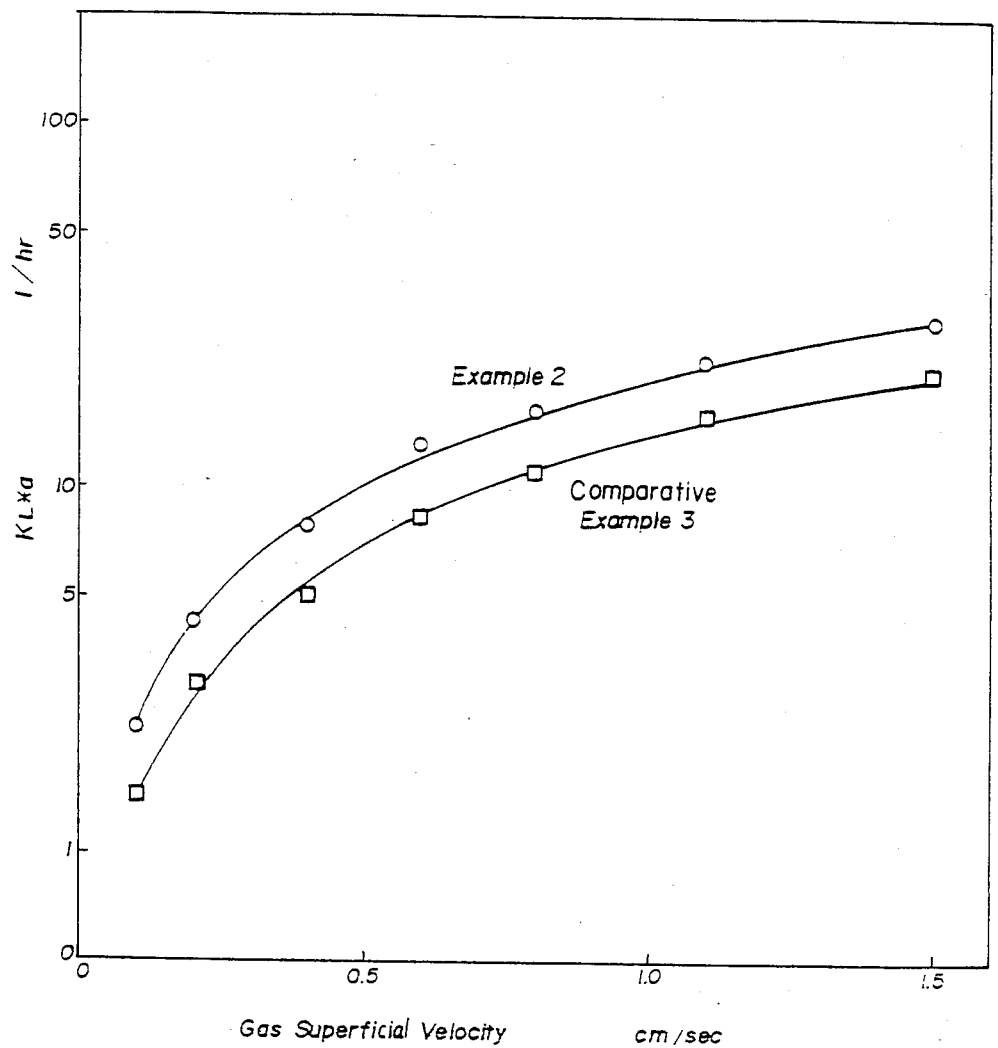
FIG. 6 is a graph showing the relationship between the gas superficial velocity and the mass transfer coefficient obtained in Example 2 and Comparative Example 3. The numerals depict: 1 . . . Slurry and liquid inlet means, 2 . . . Product liquid outlet means, 3 . . . Gas inlet means, 4 . . . Cylindrical vessel, 5 . . . Baffle with cylindrical skirt portion, 6 . . . Descending region, 7 . . . Stilling chamber, 8 . . . Cylindrical member, 9 . . . Purge gas outlet, 10 . . . Level controller, 11 . . . Gas outlet means, 12 . . . Gas separation region, 13 . . . Slurry outlet means, 14 . . . Main contacting section, 15 . . . Side Pipe.

As shown in FIG. 6, at the same gas superficial velocity, the apparatus of the present invention exhibited a volumetric liquid-phase mass transfer coefficient (KLa) higher than when the apparatus as disclosed in Japanese Patent Koukai No. 60-23483 was used.

EXAMPLES 3, 4, 5 AND COMPARATIVE EXAMPLES 4, 5

By Examples 1 and 2, it was confirmed that the apparatus of the present invention exhibits a high-gas-liquid-solid contacting efficiency and a high efficiency of separation of solid particles from gas and liquid. Therefore, hydrogenation experiments were conducted by using atmospheric bottoms of Kuwait crude oil exhibiting the properties as shown in Table 2 as the feed-stock under the reaction conditions as shown in Table 3 by use of the apparatuses of the present invention as shown in FIGS. 7, 8 and 9. In comparative Examples 4 and 5, hydrogenation was conducted by using the same feed-stock under the reaction conditions as shown in Table 3 by use of the apparatus shown in FIG. 5 used in Comparative Example 3. The results are shown in Table 3.

As shown in Table 3, in Comparative Example 4 conducted at a hydrogen/feed-stock ratio of 5,600 SCFB, a temperature distribution arose in the apparatus, coking arose at the bottom of the apparatus to deteriorate fluidity, and operation became impossible about 50 hours after the reaction conditions were reached. This is because the cylindrical member 8 of the apparatus of FIG. 5 is long, and gaseous hydrogen does not exist or exists little outside of the cylindrical member 8. As a result, hydrogen dissolved in the oil is completely consumed by the reaction at the lower section outside

TABLE 1

| | | Example No. | | |
|---|---|---|---|---|
| | | Example 1 | Comparative Example 1 | Comparative Example 2 |
| Equipment | | FIG. 2 | FIG. 3 | FIG. 4 |
| Solid particles | Average particle size, μm | 70 | ← | ← |
| | Particle size distribution, μm | 40-150 | ← | ← |
| Liquid | | water | ← | ← |
| Gas | | air | ← | ← |
| Gas superficial velocity, cm/sec | | 5.0 | ← | ← |
| Liquid withdrawing rate, l/hr | | 10.0 | ← | ← |
| Catalyst concentration in the vessel, wt % | Point a | 30.0 | | |
| | Point b | 0.1 | 30.0 | 25.0 |
| Critical gas superficial velocity required for complete suspension of solid particles cm/sec | | 0.15 | 0.15 | 0.25 | of the cylindrical member 8, and the reaction shifts from hydrogenation to thermal cracking to cause coking.

On the other hand, in Examples 3 to 5, though experiments were conducted at a hydrogen/feed-stock ratio equal to or lower than that in Comparative Example 4, no trouble arose and consistent operation was achieved in the continuous operation for about 1,500 hours or more. This is because, in Examples 3 to 5, gas-liquid-solid contact is sufficient over the whole apparatus, and the rate of supply of hydrogen dissolved in oil and necessary for hydrogenation is sufficiently higher than the hydrogen consumption rate unlike the apparatus used in Comparative Example 4.

Therefore, hydrogen in the oil is not exhausted, and the operation can be continued consistently for long periods.

Examples 4 and 5 were conducted at a hydrogen/feed-stock ratio higher than in Example 3. This is because, in Example 4, the H/L ratio is lower, the hydrogen-catalyst-oil contact area is smaller, and the rate of supply of hydrogen dissolved in oil becomes lower than in Example 3. Further, in Example 5, though the rate of supply of hydrogen dissolved in oil becomes higher than in Example 3, the flow rate of the circulated catalyst and the oil around the cylindrical member 8 is low, settlement of catalyst particles readily arises, and a catalyst particle concentration distribution readily arises at the top and the bottom of the apparatus. To avoid these problems, the hydrogen/feed-stock ratio was increased.

Also in Comparative Example 5 in which the hydrogen/feed-stock ratio was increased to 11500 SCFB and the apparatus of FIG. 5 was used, operation could be continued for about 1,200 hours without coking. However, since the hydrogen/feed-stock ratio was about three times that in Example 3, many disadvantages such as increase in compressor capacity, apparatus size, and heating and cooling utility consumption arose. The reaction results were generally inferior to those in Examples in accordance with the present invention. This is because the fluidized condition in the apparatus is complete mixing, and heavy unreacted material is discharged without sufficiently staying in the apparatus because of the high hydrogen/feed-stock ratio.

As indicated by Examples 3 to 5, the apparatus of the present invention makes it possible to obtain excellent reaction results by a small amount of gas and to achieve consistent operation for long periods.

Also, in Examples 3 to 5, the content of the catalyst entrained into the product oil discharged from the apparatus was 0.1 wt% or less of the product oil. Thus solid-liquid separation was sufficiently conducted in the apparatus of the present invention.

TABLE 2

| Property | Kuwait Atmospheric Bottoms |
|---|---|
| Gravity. °API | 13.48 |
| Gravity. SpGr 60°-160° F. | 0.976 |
| Flash Point. °F. | 260 |
| Viscosity. cSt @122° F. | 1170 |
| Pour Point. °F. | 70 |
| Con. Carbon. wt % | 13.0 |
| Asphaltenes (n-C7). wt % | 4.06 |
| Sulfur. wt % | 4.20 |
| Nitrogen. wt % | 0.35 |
| Salt. ppm | 8.0 |
| Metals. ppm | |
| Vanadium | 75 |
| Nickel | 31 |
| 640° F.+ Yield. wt % | 97.5 |
| 980° F.+ Yield. wt % | 55.8 |
| Distillation. (TBP) °F. | |
| IBP | 548 |
| 5 Vols % | 700 |
| 10 | 755 |
| 20 | 830 |
| 30 | 885 |
| 40 | 935 |
| 50 | 995 |

TABLE 3

| Example No. | Example 3 | Example 4 | Example 5 | Comparative Example 4 | Comparative Example 5 |
|---|---|---|---|---|---|
| Run No. | A | B | C | D | E |
| Equipment. | FIG. 7 | FIG. 8 | FIG. 9 | FIG. 5 | FIG. 5 |
| Catalyst. | Utilized FCC Cat. | + | + | + | + |
| Total Treating Hours. Hr | 1952 | 1516 | 1587 | 48 | 1164 |
| Operating Condition. | 825 | 825 | 825 | 825 | 825 |
| Reactor Temp. °F. | 825 | 825 | 825 | 825 | 825 |
| Reactor Press. PSIG | 1000 | 1000 | 1000 | 1000 | 1000 |
| Space Velocity. L/Hr/L | 0.55 | 0.55 | 0.55 | 0.55 | 0.55 |
| Average Catalyst Concentration in Reactor. wt % | 30 | 30 | 30 | 30 | 30 |
| Hydrogen/Feed Oil Rate. SCFB | 3900 | 5600 | 5200 | 5600 | 11500 |
| Reaction Results | | | | | |
| Hydrogen Consumed. SCFB | 1030 | 1070 | 1080 | —*1 | 1080 |
| Hydrocarbon in Gas. wt % on F.F. | 8.0 | 8.2 | 8.3 | — | 9.0 |
| Metals Removal. wt % | 94 | 92 | 95 | — | 89 |
| Asphaltenes Removal. wt % | 80 | 78 | 82 | — | 77 |
| Sulfur Removal. wt % | 68 | 64 | 66 | — | 65 |
| Nitrogen Removal. wt % | 53 | 51 | 55 | — | 49 |
| 640° F.+Conversion. wt %*2 | 65 | 63 | 65 | — | 62 |
| 980° F.+Conversion. wt %*3 | 80 | 80 | 82 | — | 78 |
| Catalyst Concentration in Product Oil. wt % | 0.05 | 0.05 | 0.10 | — | 0.10 |

*1 We could not take data for coking troubles.
*2 ((640° F.+Disti. in Feed Oil) F.+Disti. in Products Oil))/(640° F.+Disti. in Feed Oil) × 100
*3 ((980° F.+Disti. in Feed Oil) - (980° F.+Disti. in Products Oil))/(980° F.+Disti. in Feed Oil) × 100

What is claimed is:

1. An apparatus for contacting liquid combined with solids and a gas, comprising a cylindrical vessel (4) having a feed inlet (1) for receiving a liquid, a liquid outlet (2) for discharging a liquid, and, at a bottom of said cylindrical vessel, a gas inlet (3) for receiving gas to establish an ascending passage of gas into said cylindrical vessel, a baffle (5) with a cylindrical skirt portion disposed in said cylindrical vessel and defining a stilling chamber (7) on an outside region of said baffle, a lower end of said baffle being much lower than said liquid outlet and said liquid outlet being connected into said stilling chamber, and a cylindrical member (8) disposed in said cylindrical vessel spaced above said bottom of said cylindrical vessel and below a top of said cylindrical vessel, said cylindrical member being disposed along said ascending passage of gas in said vessel for receiving gas from said gas inlet, an upper end of said cylindrical member being higher than said lower end of said baffle and also higher than said liquid outlet connected into said stilling chamber, said cylindrical vessel having a main contacting section above said cylindrical member with a height and said cylindrical member having a length, a ratio of said height of said main contacting section to said length of said cylindrical member (H/L) being within the range of 2 and 50.

2. An apparatus according to claim 1, wherein said main contacting section has a cross-sectional area (Sr) and said cylindrical member has an internal cross-sectional area (Si), a ratio of said cross-sectional area of said main contacting section to said internal cross-sectional area of said cylindrical member (Sr/Si) being between 4 and 100.

3. An apparatus according to claim 1, wherein said main contacting section of said vessel has an inner diameter (D), a ratio of the length of said cylindrical member to said inner diameter of said main contacting section (L/D) being between 0.5 and 10.

4. An apparatus according to claim 1, including a plurality of gas inlets at said bottom of said vessel.

5. An apparatus according to claim 4, including a plurality of cylindrical members each over one of said gas inlets.

6. An apparatus according to claim 1, wherein said feed inlet is connected to said vessel for receiving liquid into said main contacting section, said vessel including a gas outlet at a top of said vessel for discharging gas, said stilling chamber having a gas purge outlet at a top thereof, said liquid outlet being below said top of said stilling chamber.

7. An apparatus according to claim 1, wherein said cylindrical member has a top which is slightly above a level of said liquid outlet.

8. An apparatus according to claim 1, wherein said bottom of said vessel is conical, said gas inlet being at a lowest point of said conical bottom, and a slurry outlet connected to said conical bottom above said gas inlet and at a level adjacent a lower end of said cylindrical member.

9. An apparatus for contacting oil combined with catalyst particles and hydrogen gas, comprising a cylindrical vessel (4) having a feed inlet (1) for receiving oil, a liquid outlet (2) for discharging a liquid, and, at a bottom of said cylindrical vessel, a gas inlet (3) for receiving hydrogen gas to establish an ascending passage of hydrogen gas into said cylindrical vessel, a baffle (5) with a cylindrical skirt portion disposed in said cylindrical vessel and defining a stilling chamber (7) on an outside region of said baffle, a lower end of said baffle being much lower than said liquid outlet and said liquid outlet being connected into said stilling chamber, and a cylindrical member (8) disposed in said cylindrical vessel spaced above said bottom of said cylindrical vessel and below a top of said cylindrical vessel, said cylindrical member being disposed along said ascending passage of gas in said vessel for receiving hydrogen gas from said gas inlet, an upper end of said cylindrical member being higher than said lower end of said baffle and also higher than said liquid outlet connected into said stilling chamber, said cylindrical vessel having a main contacting section above said cylindrical member with a height and said cylindrical member having a length, a ratio of said height of said main contacting section to said length of said cylindrical member (H/L) being within the range between 2 and 50, said main contacting section having a cross-sectional area (Sr) and said cylindrical member having an internal cross-sectional area (Si), a ratio of said cross-sectional area of said main contacting section to said internal cross-sectional area of said cylindrical member (Sr/Si) being between 4 and 25, and said main contacting section of said vessel having an inner diameter (D), a ratio of the length of said cylindrical member to said inner diameter of said main contacting section (L/D) being between 0.5 and 10.

10. An apparatus according to claim 9, including a plurality of gas inlets at said bottom of said vessel.

11. An apparatus according to claim 10, including a plurality of cylindrical members each over one of said gas inlets.

12. An apparatus according to claim 9, wherein said feed inlet is connected to said vessel for receiving oil into said main contacting section, said vessel including a gas outlet at a top of said vessel for discharging gas, said stilling chamber having a gas purge outlet at a top thereof, said liquid outlet being below said top of said stilling chamber.

13. An apparatus according to claim 9, wherein the upper end of said cylindrical member is slightly above a level of said liquid outlet.

14. An apparatus according to claim 9, wherein said bottom of said vessel is conical, said gas inlet being at a lowest point of said conical bottom, and a slurry outlet connected to said conical bottom above said gas inlet and at a level adjacent a lower end of said cylindrical member.

* * * * *